Patented Nov. 19, 1946

2,411,192

UNITED STATES PATENT OFFICE 2,411,192

PAINT COMPOSITIONS

Howard N. Copthorne, Winnetka, Ill., assignor to United States Steel Supply Company, a corporation of Illinois No Drawing. Application October 11, 1944, Serial No. 558,276

1 Claim. (Cl. 117—65)

This invention is an inexpensive paint composition particularly adapted for application directly onto steel sheets, after which it is baked, preferably to dryness, it having, when dry, the advantage that it is so resistant to abrasion that the coated sheets may be corrugated, as is done in making the more expensive galvanized corrugated steel sheets for roofings and sidings, or otherwise formed by means of dies, punches, etc., without destruction of the continuity of the protection it affords. When dry, the paint is weather-resistant and is reasonably attractive in appearance. While having particular advantages in the field mentioned, the paint composition may be applied to any product of a character permitting it to withstand the baking temperatures hereinafter described.

More specifically, this paint composition, in its base form, comprises by weight from 15 to 60% ferric oxide and preferably hydrated ferric oxide, which must be in the form of the pure oxides produced by precipitation from solutions of iron salts or by the thermal decomposition of iron sulphate, and from 85 to 40% vehicle oil of the class consisting of linseed oil, fish oil, soya bean oil, corn oil, tung oil, cottonseed oil, palm oil, perilla oil, oiticica oil and peanut oil, this vehicle oil preferably being oxidizable as are linseed oil and fish oil, for example. To use this base composition, it is applied directly to the product and is then treated by baking to temperatures ranging from about 500 to 690° F. for a time visibly changing the color of the ferric oxide while dehydrating it. It is to be understood that ferric oxide produced by precipitation from solutions of iron salts is generally yellow, but when produced under special conditions it may be black, and when produced by the thermal decomposition of iron sulphate it ranges from light yellowish red to deep bluish red. Baking within the temperature range disclosed, for a sufficient time, changes the yellow oxides to red, the red to dark red, and the black to reddish, with the degree of change dependent on the temperature and time of the baking.

The composition is particularly applicable to steel sheets since it is relatively immaterial whether they are slightly rusty or have traces of iron sulphate on them resulting from their pickling, it being possible to coat the sheets directly with the paint composition and to then bake as described.

All of the oils disclosed contain fatty acid glycerides which are reactive with the hydrated ferric oxide, during the baking, to form an iron soap in the finished coating, this soap giving the coating its abrasion resisting properties to a sufficient extent to permit corrugation, in the case of steel sheets, or otherwise forming or shaping the coated product without damaging the coating. It is appropriate to point out that lower baking temperatures have a tendency to oxidize the oil before effective amounts of the iron soap can be produced, while the higher temperatures promote the production of the soap prior to oxidation or drying proceeding very much. Obviously it is necessary to vary the baking temperature so as to give just that amount of soap in the coating providing adequate abrasion resistant properties, while, at the same time, providing adequate hardness through the oxidation or drying of the vehicle oil. The color change is an indication of the production of the soap and this production, in amount, is roughly in proportion to the amount of color change.

The base mixture, by itself, is too viscous for most applications and should be considered as something to be used in the light of the teachings of the painting art in general. Thus, the disclosed base mixture may be used with other drying oils, thinners, additional pigments, fillers, etc. A good representative working mixture is 25% hydrated ferric oxide of the type called "yellow oxide" by the makers of this material, 46% heavy-bodied blown linseed oil and 29% mineral spirits, the mixture being baked after its application as described. It is to be understood that the vehicle oil is preferably a heavy-bodied oil in the case of each kind of oil used, the viscosity required depending upon the methods and conditions of the application of the coating, the heavy body in the vehicle oil being obtained by blowing with air, by cooking, or by chemical treatment.

In connection with the above reference to using the base paint composition in the manner taught by the painting art, it is necessary to say that no material amount of resins can be used because the necessary subsequent baking, required in practicing the invention, results in embrittlement of the coating. Also, it is obvious that nothing should be used in the working mixture, incorporating the base composition, that would result in materially retarding the desired reaction producing the iron soap during the heating. This soap-producing reaction is more pronounced in the case of the yellow oxides and these are therefore preferred. If the reddish color resulting from the baking is not considered an appropriate color, additional pigments may be used, providing they are appropriate in the sense already discussed.

It is to be emphasized that the type of iron oxide used in connection with this invention is important. Natural iron oxides are particularly sluggish in their reaction with the vehicle oil containing the fatty acid glycerides, this resulting in the oil drying by polymerization and oxidation during the baking before any effective amount of iron soap can be formed. The commercially pure iron oxides work effectively in the manner described. It is to be understood that the yellow hydrated iron oxides react more readily with the oil described than do the red iron oxides.

I claim:

A method of coating, comprising applying a substantially resin-free coating including hydrated ferric oxide and a vehicle oil containing a fatty acid glyceride and heating the coating to from about 500 to 690° F. for a time changing the color of the ferric oxide and dehydrating the same.

HOWARD N. COPTHORNE.